United States Patent
Jackson et al.

(10) Patent No.: US 7,292,988 B2
(45) Date of Patent: Nov. 6, 2007

(54) INSTALLATION SUPPORT INFORMATION SYSTEM COLLABORATIVE TOOL

(75) Inventors: Luther Jackson, Williamstown, NJ (US); Thomas Joseph Burke, Marlton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 1025 days.

(21) Appl. No.: 09/824,430

(22) Filed: Apr. 2, 2001

(65) Prior Publication Data

US 2002/0143420 A1    Oct. 3, 2002

(51) Int. Cl.
*G06F 9/46* (2006.01)
(52) U.S. Cl. .......................................................... 705/8
(58) Field of Classification Search ..................... 705/8
See application file for complete search history.

(56) References Cited

U.S. PATENT DOCUMENTS

| | | | |
|---|---|---|---|
| 5,812,130 A | 9/1998 | Van Hueben et al. | |
| 6,119,149 A | 9/2000 | Notani | |
| 6,868,387 B1 * | 3/2005 | Krueger et al. | 705/7 |
| 6,959,268 B1 * | 10/2005 | Myers Jr. et al. | 703/6 |
| 2005/0171661 A1 * | 8/2005 | Abdel-Malek et al. | 701/33 |

FOREIGN PATENT DOCUMENTS

EP    0467257 A2 *    1/1992

OTHER PUBLICATIONS

"Ship Self Defense." Program Element Description Summary—FY1999, Published by Forecast International/DMS [Dialog File 388, Accession No. 09008530], May 20, 1998.*

* cited by examiner

*Primary Examiner*—Susanna M. Diaz
(74) *Attorney, Agent, or Firm*—Duane Morris, LLP

(57) ABSTRACT

In scheduling and controlling the upgrading of major assets such as a capital ship, the need for upgrades to various elements found on ships are determined, and the upgrade of each piece of equipment is documented as a change product. The change product documentary information is entered into a database, and correlated with information identifying those major assets, which use such products, thereby associating one or more major assets with a change product order. The major assets are scheduled for upgrade on some basis. A promised delivery date of alteration kits, manuals, or other material is obtained from the various vendors. The database may be interrogated at any time in relation to a major asset upgrade, to thereby determine the promised delivery date of the most distant delivery date of yet-undelivered material. The most distant delivery date is deemed to be the integrated logistic support date.

8 Claims, 3 Drawing Sheets

INSTALLATION SUPPORT INFORMATION SYSTEM COLLABORATIVE TOOL

FIELD OF THE INVENTION

This invention relates to lifetime support and depot operations, and more particularly to projection of job completion dates.

BACKGROUND OF THE INVENTION

In the context of lifetime support and depot operations, it may be necessary from time to time to upgrade or update a major piece of equipment, such as a ship or aircraft. In the case of a ship, these upgrades or updates are planned years in advance, and the necessary parts and equipment are procured in advance of the upgrade. Many of these parts and equipments have long procurement times. The steps of the methods necessary to perform the upgrades are also planned well in advance of the actual implementation of the upgrade. The equipments and materials needed for the upgrades will, in general, not become available simultaneously, but rather must accumulated over a period of time of months or even years, thus requiring key business partners to participate in real-time, dynamic exchange of lifetime support and depot operational components.

When a ship or other major item is to be upgraded, there is a planned starting date for the job, which may be related to availability of a dry-dock or other major site or equipment. It is very important to assure that the parts and equipment accumulation is finished or completed by the starting date for the project. It is also important to maintain records which make it possible to predict the projected date by which all the materials will have been accumulated. This record keeping is difficult because many of the required materials arrive as parts of a "alteration kit" of parts, one of which is associated with each aspect of the upgrade. For example, the materials and equipment for upgrade of a particular radar or electronics system of the ship is shipped as a single assemblage. If two such radar or electronic equipments are in use on the ship, two alteration kits must be available, one for each unit. Each alteration kit is associated with a bill of lading, which identifies the alteration kit and gives the kit part number. Inside the alteration kit packaging, or associated therewith, is a alteration instruction manual, which includes a list of parts which should be in the alteration kit. In order to verify that all the necessary parts are contained in each alteration kit when it is received at the site at which materials for the upgrade are accumulated, the alteration kit is opened and inventoried against the alteration instruction manual. The materials must then be repackaged in accordance with specifications in readiness for shipping from the material accumulation site to the upgrade work site. At some point in the accumulation process, lifetime support and depot operations collaborate on the status of critical logistical elements, which indicate what particular components of the necessary alteration kit or kits have been delivered, but as to undelivered materials, has only a manufacturer's promised delivery date upon which to rely. The scheduling of the upgrade is, of course, based upon the promised delivery dates. If these dates are not met, the materials cannot be shipped to the upgrade site so as to arrive in time for the scheduled starting date. If the materials do not arrive on the manufacturer's promised date, then, the upgrade cannot begin, and the upgrade site, as for example a dry-dock, has a ship sitting therein on which work cannot be started, at least as to the missing alteration kits. Such late-arriving alteration kits can be stored until a later scheduled upgrade time, possibly years in the future, but cannot be installed during this particular scheduled upgrade interval.

Spare parts must be provided for those parts of a ship, which are likely to break down during operation. Spare parts may be included in an alteration kit, or they may arrive separately. When the spare parts are part of an alteration kit, the spare parts provided therewith must be correlated with the list of on-board spare parts so that they can be checked off as received. Spare parts received separately from an alteration kit can be simply checked off the spare parts list.

Each ship upgrade requires upgrading of the technical manuals associated with the upgraded equipment so that the upgraded equipment may be properly maintained. If the technical manual is classified, it must be treated differently than spare parts. Documentation must be provided for the handling of the technical manuals, and their arrival in time for the upgrade must be considered.

Preventive maintenance schedule documentation can be handled in the same manner as technical manuals. In addition to technical manuals required for maintenance, technical manuals and instructions must be provided for each upgrade to be performed.

The difficulty of maintaining records and of making the determination is further compounded by the fact that different classes of ships may have equipments in common. For example, a radar or communication system may find use not only in a given class of naval vessels, such as destroyers, but also in some other class of ships, such as cruisers or even tankers. In some cases, similar ships of the navies of other countries may be impacted.

The determination of the status of completion of accumulation of all the alteration kits, spare parts, and manuals and other documentation associated with upgrades is a very difficult task.

Improved methods are desired for the determination of the status of accumulation of the necessary equipments for an upgrade of a major asset.

SUMMARY OF THE INVENTION

A method according to an aspect of the invention is for determining the Integrated Logistic Support (ILS) date for any particular ship upgrade or alteration. The method resolves potential discrepancies and delay of information flows by providing real-time collaboration against the ILS date. The method includes the step of generating change documents for correcting at least some perceived problems associated with a particular type of equipment associated with at least one major asset, which in the described embodiment is a ship. In a computer, each the change documents is associated with the identities of one or more ships having the particular type of equipment. At least one of the major assets having the particular type of equipment is scheduled for upgrade beginning on a particular date. A promised delivery date for each alteration kit associated with each ship upgrade is obtained from material vendors. A particular ship upgrade is selected for which the ILS date is desired. For the selected ship upgrade, that one of the promised dates which is most remote in time is selected, and deemed to be the ILS date.

DESCRIPTION OF THE INVENTION

Figure 1:
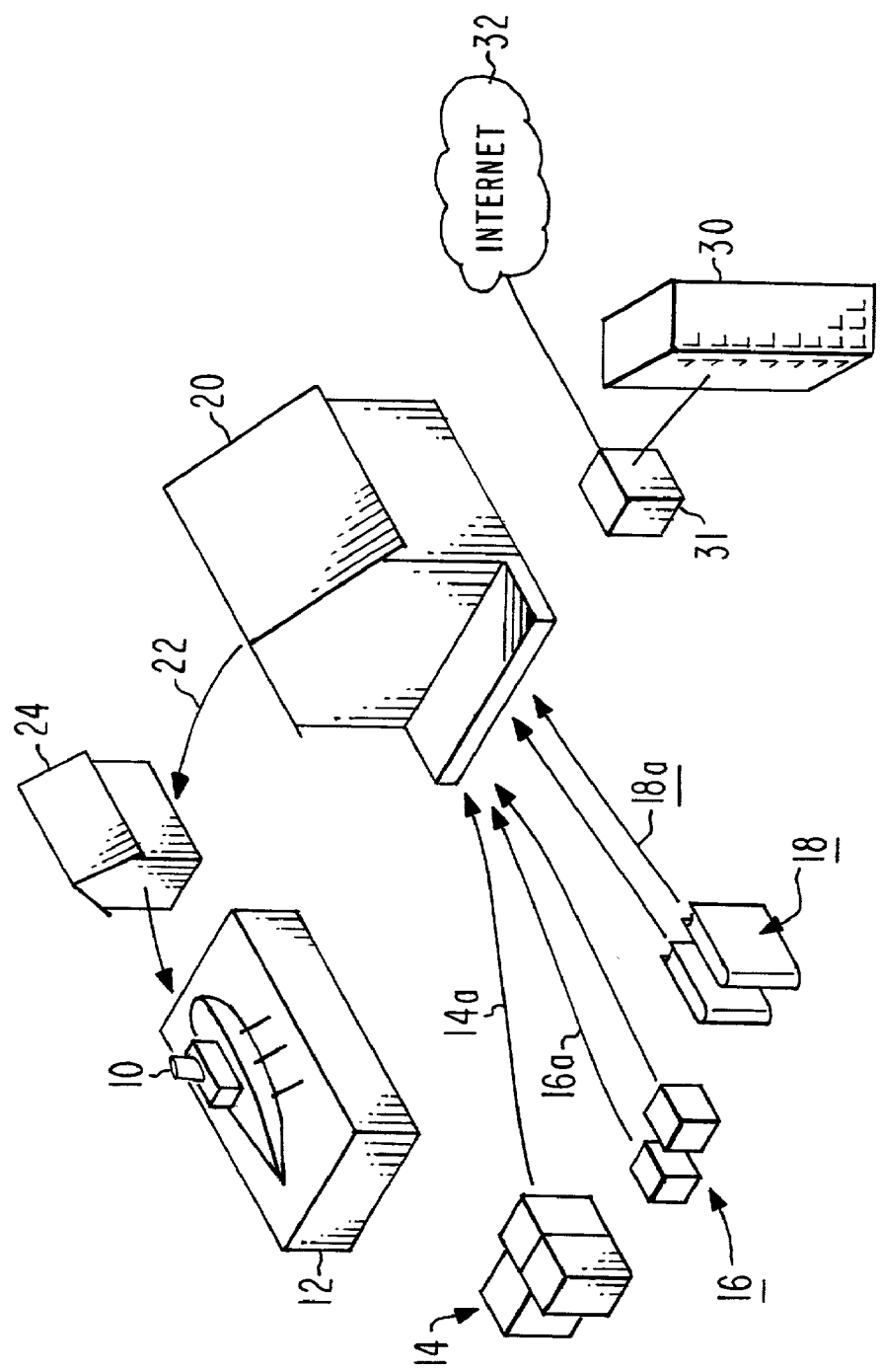
FIG. 1 is a simplified illustration of the environment in which the invention is useful.

In FIG. 1, an upgrade of a ship 10 is scheduled for a particular date, and the ship should be in a dry-dock or other facility 12 on the scheduled date. Prior to the scheduled starting time for the upgrade, alteration kits, illustrated as crates 14, spare parts packages 16, and documentation, illustrated as manuals 18, arrive at various times, as suggested by arrows 14a, 16a, and 18a, at a warehouse or other storage facility 20. Once the materials for the upgrade have been accumulated at storage facility 20, the materials are transported, as suggested by arrow 22, to a site, storage building or warehouse 24 near the site or facility 12. The materials are thus readily available for the upgrades as work progresses. It will be appreciated that the various sites at which the alteration kits, spare parts, and documentation are manufactured or fabricated may be at various widely spaced locations, and may even be continents apart. Similarly, the warehouse 20 may be on one continent, and the facility 12 on another. The administrative control center 30 for the various upgrades may itself be distant from all of the other facilities of FIG. 1.

According to an aspect of the invention, the administrative control center 30 of FIG. 1 has access to a computer system, illustrated in FIG. 1 as a box 31. Computer system 31 includes a database. The database contains information which may be useful to various ones of the manufacturers or vendors of the alteration kits, spare parts, and/or documentation. In order to provide timely information to the administrative control center and to the interested parties, all of the facilities, including computer 31, warehouses 20 and 24, and facility 12, and even ship 10, may have connections to the Internet, illustrated as a cloud 32, and the database may be made available for reading from remote sites by way of the Internet. The location of the computer system 31 is not associated with any location in FIG. 1, since the computer system may be distributed, and in any case, even if "centralized" in a single computer, it is available to all locations by way of the internet 32.

Figure 2A:
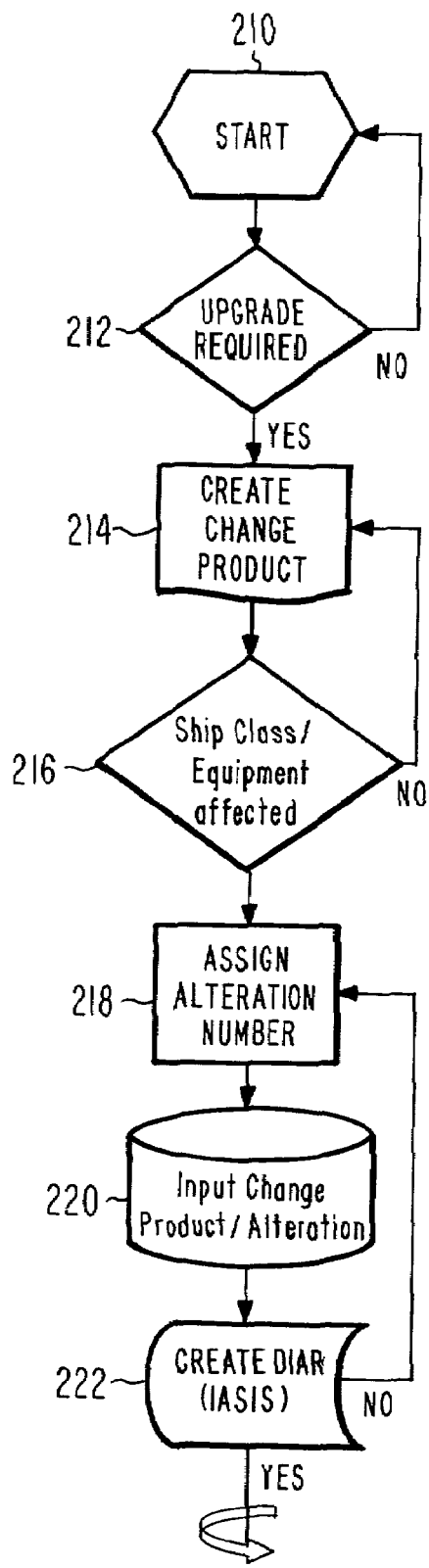
FIGS. 2a and 2b together represent logic or activity flow according to an aspect of the invention, at least part of which is performed on a computer.
Figure 2B:
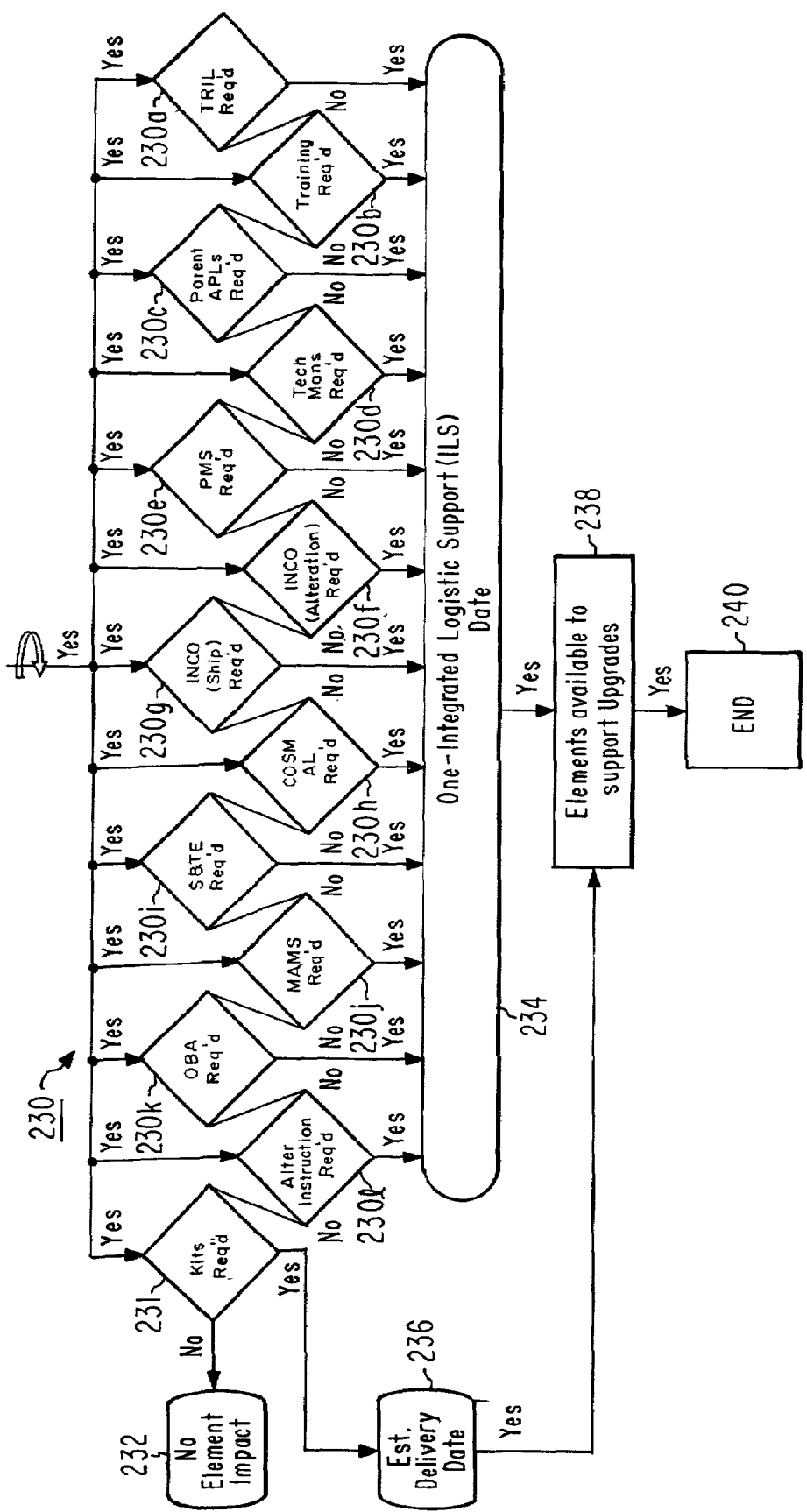

FIGS. 2a and 2b together form a simplified flow diagram illustrating the logic associated with computer 31 and the outside world to allow determination of the availability of the various elements required to perform an upgrade on a particular ship or other major asset. In FIG. 2a, item 210 represents a logic start block, and the logic flows to a decision block 212. So long as a change to a ship is not perceived as being required, the logic exits decision block 212 by the NO output, and flows back to the Start block 210. Eventually, one or more upgrades will be required, in which case the logic leaves decision block 212 by the YES output, and arrives at a block 214. Block 214 represents the generation of a change product document. The change product document is prepared by an engineer or engineering team in response to a perceived deficiency in the nature of the ship or other asset. Such a deficiency might be premature degradation of some item of machinery, electronics or software, or it might represent an enhancement of the performance of some item such as a radar system. The change document includes a title of the change document, a rough solution to the perceived problem, the identification of the system which is impacted, and includes the estimated cost, and also includes much other information, such as description of the problem, drawings which must be changed, proposed vendors for the various parts, and the like. Since the change document produced in response to block 214 is generated in response to a perceived problem, it can apply only to those certain classes of ships fitted with the type of equipment in which the problem arises.

From change product creation block 214, the logic flows to a decision block 216, which determines whether the class of ship in question is affected. If not, the logic returns to block 214 by the NO output of decision block 216. If the change product order affects ships of the class in question, the logic flows from the YES output of decision block 214 to a block 218, which represents the assignment of an alteration number to the change product order. Thus, the change order is associated in the database with a particular alteration (major upgrade) of a particular ship. The resulting combined information relating to the change product order and its associated alteration(s) is entered into the database, as represented by block 220. After the information is entered into the database, the database can be interrogated, as suggested by block 222, to create a detailed Integrated Logistic Support (ILS) analysis report (DIAR) or an Internet Alteration Installation Support Information System (IAISIS) analysis report or document, as suggested by the YES output of block 222. If such a report is not currently desired, the logic leaves block 222 and returns by the NO output to block 218 for assignment of another alteration number.

From the YES output of block 222 of FIG. 2a, the logic flows to an array 230 of decision blocks, including decision blocks 230a, 230b, 230c, 230d, 230e, 230f, 230g, 230h, 230i, 230j, 230k, 2301, and 231. The NO output ports of the decision blocks of set 230 are joined together, and a NO logic output from all of the decision blocks of set 230 causes the logic to flow to a block 232, which represents a lack of an impact on the elements required. There is a yes label at the input of each decision block because at each block there is a decision of yes or no. If the decision is yes, the block becomes part of the ILS engine to determine the date. If the decision is no, then there is no ILS impact. If there is an impact on the elements, then the logic flows to block 234, representing the determination of the Integrated Logistic Support (ILS) date.

More particularly, decision block 230a of FIG. 2b_determines from the database whether a Tailored Repairable Items List (TRIL) is required. If not, the logic flows to block 232. If TRIL is required, the logic flows to an input port of a block 234, the One Integrated Logistic Support (ILS). Similarly, decision block 230b determines whether training is required to implement the alteration of the ship in question, and the logic flows to block 232 if no training is needed, and to block 234 if training is needed. In the same fashion, decision block 230c determines whether the Allowance Parts List (APL) is required, decision block 230d determines whether technical manuals are required, block 230e determines whether a Preventive Maintenance Schedule (PMS) and Maintenance Requirement Cards (MRC) are required, block 230f determines whether shipyard Installation and Checkout Spares List (INCO) is required, block 230g determines whether an Alteration Installation and Checkout Spares List (INCO AL) is required, block 230h determines whether Coordinated Shore Base Material Allowance List (COSMAL) is required, block 230i determines whether Support and Test Equipment (S&TE) is required, block 230j determines whether Maintenance Assist Modules (MAMS) is required, decision block 230k determines whether an On-Board Allowance (OBA) is required, and decision block 2301 determines whether alteration instructions are required, and each advises block 234 if there is a requirement, or routes its logic to block 232 if there is no requirement. Similarly, the logic from block 222 of FIG. 2a also flows to block 231 of FIG. 2b, which determines whether alteration parts kits are required. If no alteration parts kits are required, the logic flows from the NO output port of decision block 231 to block 232. If alteration parts kits are required, the logic flows to a block 236, which represents the determination of the promised delivery date for those not yet arrived.

If the determination is made in block 231 that an alteration parts kit is required, the logic flows to a block 236, which represents the determination of the estimated delivery date (EDD) on which the parts kit will become available. Block 236 yes output monitors only the Estimated delivery date of the Alteration kit. These kit items are not considered to be decision inputs to determination of the ILS date, but used in a decision to determine whether work can begin on the ship on a specified date. The Estimated kit Delivery Date, block 236, is provided to block 238, which compares the estimated kit date and/or the ILS date, block 234, with a date (which may not be the current date) at which it is desired that work begin, to generate an output indicating whether work can begin on the ship on the specified date.

One Integrated Logic Support block 234 of FIG. 2b responds to the YES outputs from one or more of the decision blocks of set 230, to determine the date on which each of the selected or "YES" elements arrived or is to arrive, and to select from among those dates the last or most remote date representing the longest lead time. At the time that this determination is made, the specified date may be in the past, in the present, or in the future. The ILS date is provided to a block 238, which compares the ILS date with the date (which may not be the current date) at which it is desired that work begin, to generate an output indicating whether work can begin on the ship on the specified date.

Other embodiments of the invention will be apparent to those skilled in the art. For example, the determination of the Integrated Logistic support date is related to the configurable logistical elements entered into the database.

Thus, a method according to an aspect of the invention is for determining the ILS date for any particular ship upgrade or alteration. The method resolves potential discrepancies and delay of information flows by providing real-time collaboration against the ILS date. The method includes the step of generating change documents (block 214) for correcting at least some perceived problems associated with a particular type of equipment associated with at least one major asset, which in the described embodiment is a ship. As maintained in the database (31), each of the change documents is associated (block 214) with the identities of one or more ships having the particular type of equipment. At least one of the major assets (ships in the example) having the particular type of equipment is scheduled (block 220) for upgrade beginning on a particular date. A promised delivery date for each alteration kit associated with each ship upgrade is obtained (block 236) from material vendors. When a particular ship is scheduled to become available for update, that particular ship upgrade is selected (block 216) for which the ILS date is desired. For the selected ship upgrade, that one of the promised dates which is most remote in time is selected (block 234), and deemed to be the ILS date. If the ILS date is prior to the date on which that ship becomes available for upgrade, the upgrade can proceed on that ship. If the ILS date is later than the time at which the ship becomes available for upgrade, the upgrade cannot be performed a the time at which the ship is available, and those portions of the ship upgrade which cannot be scheduled for the ship's scheduled date in dock for repairs can be rescheduled for a later time at which the ship becomes available. As an alternative, some action can be taken to improve the delivery time of any one of the various upgrades which may be deemed to be critical.

What is claimed is:

1. A method for determining an integrated logistic support (ILS) date at which a particular ship upgrade can proceed, said method comprising the steps of:
generating a change document in response to a perceived problem associated with a particular type of equipment, for correcting the perceived problem, said change document comprising a description of the problem, an identification of the system impacted, a solution to the perceived problem, an estimated cost of the solution, drawings which must be changed, and proposed vendors for the various parts associated with the solution;
associating said change document with those ships having said particular type of equipment;
associating the particular ship upgrade with the change document for that that particular ship upgrade;
determining arrival dates of all elements associated with the particular upgrade associated with the change document;
selecting a most remote one of the determined arrival dates as the ILS date; and
generating an output indicating whether work can begin on the particular ship on the specified ILS date;
wherein said step of determining arrival dates of all elements associated with the particular upgrade associated with the change document includes the steps of;
determining if (a) a Tailored Repairable Items List is required, (b) training is required to implement the alteration of the ship, (c) an Allowance Parts List is required, (d) technical manuals are required, (e) Preventive Maintenance Schedule and Maintenance Requirement Cards are required, (f) a shipyard Installation and Checkout Spares List is required, (g) an Alteration Installation and Checkout Spares List is required, (h) a Coordinated Shore Base Materiel Allowance List is required, (i) Support and Test Equipment is required, (j) Maintenance Assist Modules are required, (k) On-Board Allowance is required, and (l) alteration instructions are required.

2. A method according to claim 1, further comprising the steps of:
obtaining a promised delivery date for delivering an upgrade parts kit; and
comparing the promised delivery date with a selected starting date for said ship upgrade.

3. A method according to claim 1, wherein said step of generating a change document is performed by engineering personnel.

4. A method according to claim 1, wherein said step of associating said change document with those ships having said particular type of equipment includes the step of determining whether a particular class of ship is affected.

5. A method according to claim 1, wherein said step of associating the particular ship upgrade with the change document for that that particular ship upgrade includes the step of assignment of an alteration number representing a particular alteration of a particular ship.

6. A method according to claim 1, wherein said step of determining arrival dates of all elements associated with the particular upgrade associated with the change document includes the steps of:
determining whether alteration parts kits are required; and
if alteration parts kits are required, determining the promised delivery date for those not yet arrived.

7. A method for determining an integrated logistic support (ILS) date at which a particular ship upgrade can proceed, said method comprising the steps of:

generating a change document, for correcting a perceived problem associated with a particular type of equipment, said change document comprising a description of the problem, an identification of the system impacted, a solution to the perceived problem, an estimated cost of the solution, drawings which must be changed, and proposed vendors for the various parts associated with the solution;

associating said change document with those ships having said particular type of equipment;

associating the particular ship upgrade with the change document for that that particular ship upgrade;

determining arrival dates of all elements associated with the particular upgrade associated with the change document;

selecting a most remote one of the determined arrival dates as the ILS date;

comparing the ILS date with a selected starting date for the ship upgrade; and generating an output indicating whether work can begin on the particular ship on the specified ILS date;

wherein said step of determining arrival dates of all elements associated with the particular upgrade associated with the change document includes the steps of;

determining if (a) a Tailored Repairable Items List is required, (b) training is required to implement the alteration of the ship, (c) an Allowance Parts List is required, (d) technical manuals are required, (e) Preventive Maintenance Schedule and Maintenance Requirement Cards are required, (f) a shipyard Installation and Checkout Spares List is required, (g) an Alteration Installation and Checkout Spares List is required, (h) a Coordinated Shore Base Materiel Allowance List is required, (i) Support and Test Equipment is required, (j) Maintenance Assist Modules are required, (k) On-Board Allowance is required, and (l) alteration instructions are required.

8. A method according to claim 7, further comprising the steps of:

obtaining a promised delivery date for delivering an upgrade parts kit; and comparing the promised delivery date with the selected starting date.

* * * * *